(12) United States Patent
Bibelnieks et al.

(10) Patent No.: US 7,246,083 B2
(45) Date of Patent: *Jul. 17, 2007

(54) SYSTEM AND METHOD FOR TARGETED MARKETING OF GOODS AND/OR SERVICES TO SPECIFIC CUSTOMERS

(75) Inventors: Eric Bibelnieks, Ogema, WI (US); Mark Bullock, Racine, WI (US); Michael Haydock, Chanhassen, MN (US); Mindy Schiller, Tampa, FL (US); Wayne Kugel, Chisago City, MN (US); Edwin Peter Dawson Pednault, Cortlandt Manor, NY (US); Nancy Soderquist, Anoka, MN (US); Harlan Crowder, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 489 days.

This patent is subject to a terminal disclaimer.

(21) Appl. No.: 10/401,935

(22) Filed: Mar. 27, 2003

(65) Prior Publication Data

US 2003/0208402 A1 Nov. 6, 2003

Related U.S. Application Data

(63) Continuation of application No. 09/398,921, filed on Sep. 16, 1999, now Pat. No. 6,567,786.

(51) Int. Cl.
 *G06Q 30/00* (2006.01)
(52) U.S. Cl. ............... 705/14; 705/1; 705/10; 705/26; 705/27; 235/375; 235/383

(58) Field of Classification Search ............... 705/14
See application file for complete search history.

(56) References Cited

U.S. PATENT DOCUMENTS

| 4,908,761 | A | 3/1990 | Tai ....................... 364/401 |
| 5,227,874 | A | 7/1993 | Von Kohorn ............ 705/10 |
| 5,278,751 | A | 1/1994 | Adiano et al. .......... 364/402 |

(Continued)

FOREIGN PATENT DOCUMENTS

WO   WO 99/22328   5/1999

(Continued)

OTHER PUBLICATIONS

TSS and Ralphs Grocery renew contract for automated coupon terminals, Mar. 26, 1991, Business Wire.*

(Continued)

*Primary Examiner*—Jean D. Janvier
(74) *Attorney, Agent, or Firm*—Synnestvedt & Lechner LLP

(57) ABSTRACT

A method, and system for targeted marketing of goods or services to specific customers is disclosed. Customers are analyzed based upon historical criteria; a promotional plan (a group of promotion events implemented or to be implemented over a particular time period) is analyzed to determine the effect of each promotion event on the other promotion events in the promotional plan; and, based on this analysis, the optimal promotion stream (a specific subset of the promotional plan to be sent to customers or a group of similar customers) is determined so as to maximize the ROI of the promotional plan as a whole.

20 Claims, 11 Drawing Sheets

U.S. PATENT DOCUMENTS

| | | | |
|---|---|---|---|
| 5,717,923 A | 2/1998 | Dedrick | 705/13 |
| 5,740,549 A | 4/1998 | Reilly et al. | 705/14 |
| 5,758,257 A | 5/1998 | Herz et al. | 455/2 |
| 5,774,868 A | 6/1998 | Cragun et al. | 705/14 X |
| 5,819,241 A | 10/1998 | Reiter | 705/408 |
| 5,819,285 A | 10/1998 | Damico et al. | 707/104 |
| 5,832,457 A | 11/1998 | O'Brien et al. | 705/14 X |
| 5,914,670 A | 6/1999 | Goodwin, III et al. | 705/14 X |
| 5,918,014 A * | 6/1999 | Robinson | 709/219 |
| 5,930,764 A | 7/1999 | Melchione et al. | 705/10 |
| 5,933,811 A | 8/1999 | Angles et al. | 705/14 |
| 5,937,387 A | 8/1999 | Summerell et al. | 705/2 |
| 5,940,809 A | 8/1999 | Musmanno et al. | 705/35 |
| 5,946,661 A | 8/1999 | Rothschild et al. | 705/7 |
| 5,970,464 A | 10/1999 | Apte et al. | 705/4 |
| 6,267,672 B1 | 7/2001 | Vance | 705/14 X |
| 6,286,005 B1 * | 9/2001 | Cannon | 707/100 |
| 6,567,786 B1 * | 5/2003 | Bibelnieks et al. | 705/14 |
| 2001/0014868 A1 * | 8/2001 | Herz et al. | 705/14 |

FOREIGN PATENT DOCUMENTS

WO      WO 9922328 A1 *    5/1999

OTHER PUBLICATIONS

*Customer Relationship Management*, http://www.socap.org/article.html, (Sep. 6, 1999).

*FMR Systems*, wysiwyg://18/http://www.fmr-systems.com/, (Sep. 6, 1999).

*FMR Systems*, wysiwyg://20/http://www.fmr-system.management%20system%overview.htm, (Sep. 6, 1999).

*Front Line Solutions*, http://www.frontlinehq.com, (Sep. 6, 1999).

*ActionWare Articles*, http://www.actionware.com/DMedia/articles.htm, (Sep. 6, 1999).

*ActionWare for Marketing and Lead Management*, http://www.actionware.com/DProducts/solmkt.htm, (Sep. 6, 1999).

*IBM Systems Solutions for ActionWare*, http://www.actionware.com/DProducts/IBMsol.htm, (Sep. 6, 1999).

*Operational Research in Industry*, edited by T. Ciriani, S. Gliozzi, E. Johnson and R. Tadei, pp. 259-263 (Jun. 1999), MacMillan Business, Hounmills, Basingstoke, Hampshire RG21 GXS).

*S/390 Treasure Series: DecisionEdge for utilities, telecommunications and banking*, IBM data sheet (1998).

* cited by examiner

FIG. 3

| | P-n | ... | P-3 | P-2 | P-1 | P | P+1 | P+2 | P+3 | P+4 | ... | P+n |
|---|---|---|---|---|---|---|---|---|---|---|---|---|
| C | 1 | | 0 | 1 | 1 | 1 | 0 | 1 | 1 | 0 | | 1 |
| C1 | 0 | | 1 | 1 | 0 | 0 | 1 | 1 | 0 | 1 | | 0 |
| C2 | 0 | | 0 | 1 | 1 | 0 | 1 | 0 | 1 | 0 | | 1 |
| C3 | 1 | | 1 | 1 | 1 | 1 | 1 | 0 | 1 | 1 | | 0 |
| ... | 0 | | 1 | 1 | 0 | 0 | 1 | 0 | 1 | 0 | | 1 |
| Cn | 0 | | 0 | 1 | 0 | 0 | 1 | 0 | 1 | 1 | | 0 |

| C0 | C1 | C2 | C3 | ... | Cn |
|---|---|---|---|---|---|
| 1 | 0 | 0 | 1 | | 1 |

P

10

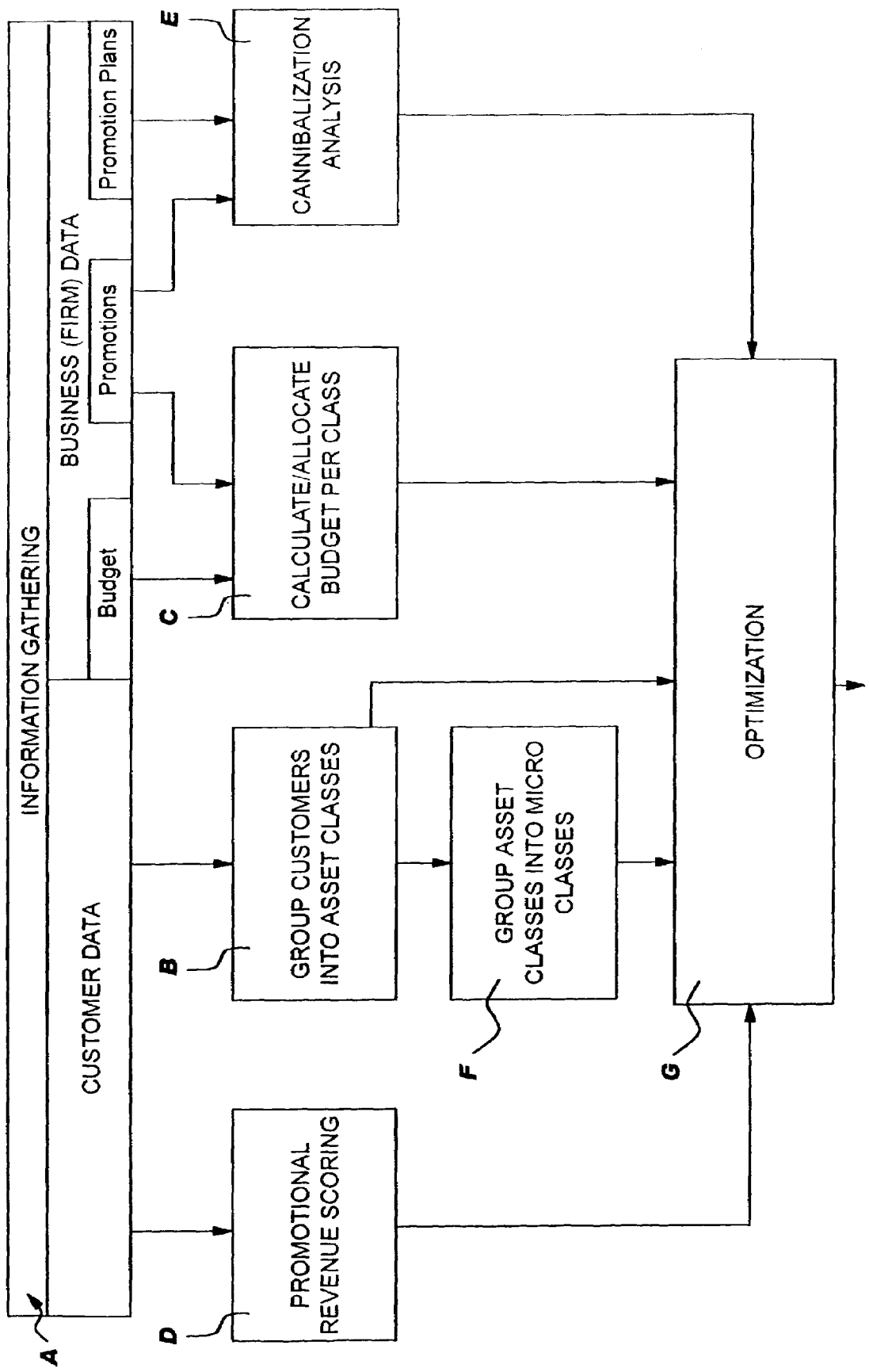

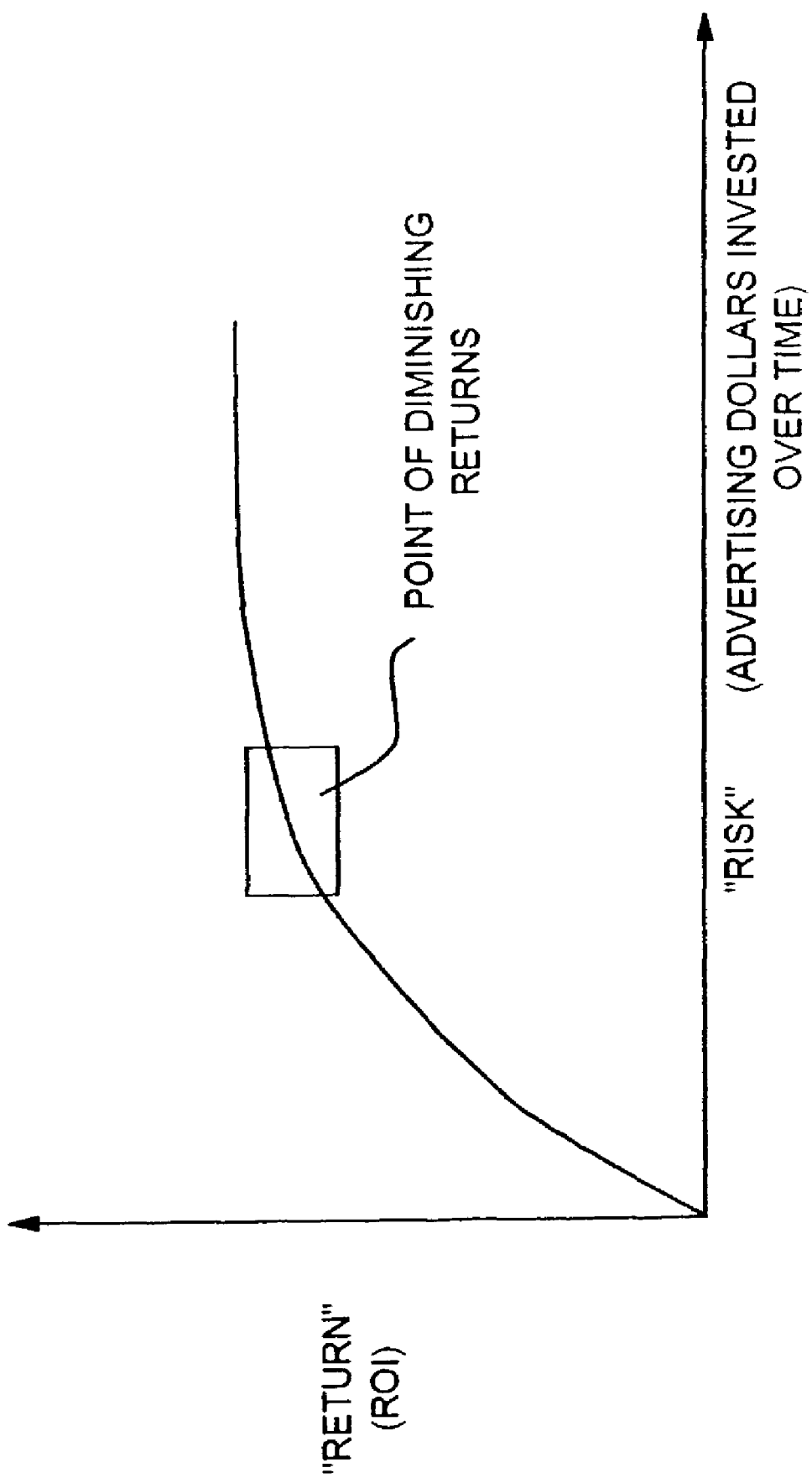

FIG. 7

| | P-n | ... | P-3 | P-2 | P-1 | P0 | P+1 | P+2 | P+3 | P+4 | ... | P+n |
|---|---|---|---|---|---|---|---|---|---|---|---|---|
| P+n | 0 | ... | 0 | 0 | 0 | 0 | 10 | 20 | 30 | 40 | ... | X |
| ... | ... | ... | ... | ... | ... | ... | ... | ... | ... | ... | ... | ... |
| P+4 | 0 | ... | 0 | 0 | 10 | 20 | 30 | 40 | 50 | X | ... | 30 |
| P+3 | 0 | ... | 0 | 10 | 20 | 30 | 40 | 50 | X | 40 | ... | 20 |
| P+2 | 0 | ... | 10 | 20 | 30 | 40 | 50 | X | 40 | 30 | ... | 10 |
| P+1 | 0 | ... | 20 | 30 | 40 | 50 | X | 40 | 30 | 20 | ... | 0 |
| P0 | 10 | ... | 30 | 40 | 50 | X | 40 | 30 | 20 | 10 | ... | 0 |
| P-1 | 20 | ... | 40 | 50 | X | 40 | 30 | 20 | 10 | 0 | ... | 0 |
| P-2 | 30 | ... | 50 | X | 40 | 30 | 20 | 10 | 0 | 0 | ... | 0 |
| P-3 | 40 | ... | X | 40 | 30 | 20 | 10 | 0 | 0 | 0 | ... | 0 |
| ... | ... | ... | ... | ... | ... | ... | ... | ... | ... | ... | ... | ... |
| P-n | X | ... | 30 | 20 | 10 | 0 | 0 | 0 | 0 | 0 | ... | 0 |

FIG. 9

| | P-n | ... | P-3 | P-2 | P-1 | P0 | P+1 | P+2 | P+3 | P+4 | ... | P+n |
|---|---|---|---|---|---|---|---|---|---|---|---|---|
| P+n | 30 | | 20 | 30 | 20 | 70 | 60 | 10 | 10 | 20 | | X |
| ... | | | | | | | | | | | | |
| P+4 | 10 | | 10 | 30 | 50 | 90 | 30 | 20 | 30 | X | | 20 |
| P+3 | 20 | | 90 | 60 | 20 | 30 | 20 | 60 | X | 30 | | 10 |
| P+2 | 50 | | 20 | 20 | 30 | 0 | 50 | X | 60 | 20 | | 10 |
| P+1 | 100 | | 90 | 0 | 10 | 60 | X | 50 | 20 | 30 | | 60 |
| P0 | 10 | | 50 | 40 | 40 | X | 50 | 0 | 30 | 90 | | 70 |
| P-1 | 70 | | 90 | 10 | X | 40 | 10 | 30 | 20 | 50 | | 20 |
| P-2 | 30 | | 0 | X | 10 | 40 | 0 | 20 | 60 | 30 | | 30 |
| P-3 | 0 | | X | 0 | 90 | 50 | 90 | 20 | 90 | 10 | | 20 |
| ... | | | | | | | | | | | | |
| P-n | X | | 0 | 30 | 70 | 10 | 100 | 50 | 20 | 10 | | 30 |

FIG. 10

| | P-n | ... | P-3 | P-2 | P-1 | P0 | P+1 | P+2 | P+3 | P+4 | ... | P+n |
|---|---|---|---|---|---|---|---|---|---|---|---|---|
| P+n | 20 | | 50 | 80 | 90 | 60 | 50 | 90 | 10 | 20 | | X |
| ... | | | | | | | | | | | | |
| P+4 | 60 | | 10 | 70 | 0 | 70 | 100 | 30 | 20 | X | | 20 |
| P+3 | 40 | | 70 | 50 | 50 | 0 | 60 | 10 | X | 20 | | 10 |
| P+2 | 60 | | 20 | 10 | 30 | 60 | 30 | X | 10 | 30 | | 90 |
| P+1 | 10 | | 10 | 70 | 0 | 80 | X | 30 | 60 | 100 | | 50 |
| P0 | 10 | | 20 | 80 | 20 | X | 80 | 60 | 0 | 70 | | 60 |
| P-1 | 90 | | 30 | 10 | X | 20 | 0 | 30 | 50 | 0 | | 90 |
| P-2 | 40 | | 60 | X | 10 | 80 | 70 | 10 | 50 | 70 | | 80 |
| P-3 | 70 | | X | 60 | 30 | 20 | 10 | 20 | 70 | 10 | | 50 |
| ... | | | | | | | | | | | | |
| P-n | X | | 70 | 40 | 90 | 10 | 10 | 60 | 40 | 60 | | 20 |
| | P-n | ... | P-3 | P-2 | P-1 | P0 | P+1 | P+2 | P+3 | P+4 | ... | P+n |

FIG. 11

|     | P-n | ... | P-3 | P-2 | P-1 | P0 | P+1 | P+2 | P+3 | P+4 | ... | P+n |
|-----|-----|-----|-----|-----|-----|-----|-----|-----|-----|-----|-----|-----|
| P-n | X   |     | .35 | .48 | .75 | .05 | 0   | 0   | 0   | 0   |     | 0   |
| ... |     |     |     |     |     |     |     |     |     |     |     |     |
| P-3 | .26 |     | X   | .375| 1.5 | .64 | .7  | .10 | 0   | 0   |     | 0   |
| P-2 | .325|     | .30 | X   | .25 | 1.0 | .26 | .175| .29 | 0   |     | 0   |
| P-1 | .375|     | 1.12| .2  | X   | .88 | .15 | .45 | .27 | .19 |     | 0   |
| P0  | 0   |     | .42 | .75 | .7  | X   | 1.62| 1.2 | .34 | .85 |     | 0   |
| P+1 | 0   |     | .35 | .175| .11 | 1.15| X   | 1.1 | .60 | .71 |     | .29 |
| P+2 | 0   |     | 0   | .09 | .3  | .225| .90 | X   | 1.18| .45 |     | .30 |
| P+3 | 0   |     | 0   | 0   | .14 | .225| .45 | .95 | X   | .69 |     | .15 |
| P+4 | 0   |     | 0   | 0   | 0   | .425| .47 | .33 | .55 | X   |     | .50 |
| ... |     |     |     |     |     |     |     |     |     |     |     |     |
| P+n | 0   |     | 0   | 0   | 0   | 0   | 0   | .15 | .10 | .30 |     | X   |

SYSTEM AND METHOD FOR TARGETED MARKETING OF GOODS AND/OR SERVICES TO SPECIFIC CUSTOMERS

CROSS-REFERENCE TO RELATED APPLICATIONS

This application is a continuation of, and claims priority to, U.S. application Ser. No. 09/398,921, filed Sep. 16, 1999 now U.S. Pat. No. 6,567,786.

FIELD OF THE INVENTION

The present invention relates generally to a marketing system and method, and in particular, to a system and method for increasing the effectiveness of customer contact strategies.

BACKGROUND OF THE INVENTION

Direct marketing involves advertising to customers at a location other than the point of sale. Catalogs, first-class mail, telemarketing, and e-mail are some examples of direct marketing techniques that are currently utilized to promote the sale of goods or services.

Direct marketers today face challenges that are far different than those with which the industry contended during its explosive growth over the last twenty years. Among the problems of particular interest:

The percentage of households purchasing through the mail has been essentially flat since 1993.

The consumer base is becoming increasingly diverse and individualistic.

The average number of promotions received per household continues to climb.

The costs of advertising (and in particular, paper, postage and ink) has been steadily increasing and shows no sign of leveling off.

Consumers increasingly demand services such as the ability to place phone orders and expedited delivery as standard.

Increasingly, retail companies are adding direct marketing to their mix of marketing techniques. In addition, with the explosion of the internet and e-commerce, consumers are presented with increasingly attractive alternatives to mail for the direct purchase of goods and services in their homes.

In response to these changes, direct marketers have responded in a variety of ways. Many direct marketers have improved their targeting of recipients of direct marketing through automation. For example, automation has been achieved by programming computers to perform sophisticated statistical analysis and modeling, develop marketing databases, increase the sophistication of their predictive models, or enhance their current processes with leading edge marketing tools such as data mining. While these efforts have helped reduce the negative impact of the changing marketing atmosphere, the industry has not been able to improve the average response rate to direct marketing.

A commonly-used marketing technique is called the RFM (Recency, Frequency and Monetary Value) technique. PCT International Application No. PCT/US908/22613, published as International Publication No. WO 99/22328 (incorporated fully herein by reference) discloses a computer-implemented targeted marketing system which evaluates many factors, including the RFM factors, to determine a customer list to be used for sending marketing materials in connection with a single proposed promotion event. The RFM technique is based on the theory that the customers that are most likely to respond to a proposed direct marketing event (e.g., a mailing of an offer) are those that have most recently been customers (Recency), and that have frequently been repeat customers (Frequency), and that have purchased significant dollar amounts (Monetary Value). Existing customers are scored based on their characteristics related to each of these three criteria, and a customer with a high RFM score is considered a good target for the proposed marketing event under analysis. Based on the RFM scores, a specialized customer list is generated for a single proposed marketing event.

FIG. 1 portrays a "promotion flag" table which is used herein to explain the prior art RFM method of determining if a customer should receive a particular promotion "p." RFM marketing techniques are a form of "natural selection." All customers (depicted in numerical order by customer number in FIG. 1 along the vertical axis as C0, C1, . . . , Cn) are sorted and ordered in a known manner from highest to lowest RFM score for a single promotion, and then a threshold line is drawn at a predetermined point based on expected sales and profitability. All customers on or above the threshold line are included in the current promotion, and all those below the line are excluded. In the promotion flag table of FIG. 1, a "1" indicates that a customer has scored at or above the threshold (i.e., that the customer is a "go" for inclusion in the promotion) and a "0" indicates that the customer scored below the threshold (i.e., that the customer is a "no-go" for inclusion in the promotion). Thus, high RFM customers are selected to become repeat targets while the lower RFM customers are targeted less or not at all.

Though the RFM technique achieves adequate results, since the focus is on only a single proposed marketing campaign at a time, a marketer ends up saturating its best customers with promotions, often sending out a subsequent and possibly redundant promotion before the previous promotion has been allowed to generate it's maximum return-on-investment (ROI). Further, low RFM customers, which may represent a major growth opportunity for the marketer, receive little or no attention.

The Applicant recognizes the desirability of a marketing method and system which analyzes customer preferences, needs, and historical tendencies, which looks at an entire promotional plan comprising a set of at least two proposed promotion events and takes into account the effects of a current promotion event on promotion events generated before, simultaneous with, and after the current promotion event.

SUMMARY OF THE INVENTION

The present invention takes a more global approach to marketing and focuses on the customer rather than any one particular promotion event, and factors in the effect on each other of promotion events to be implemented and already implemented. The present invention improves upon prior art marketing methods by analyzing customers based upon historical criteria; analyzing a promotional plan (a group of promotion events implemented or to be implemented over a particular time period) to determine the effect of each promotion event on the other promotion events in the promotional plan; and, based on this analysis, determining the optimal promotion stream (a specific subset of the promotional plan to be sent to customers or a group of similar customers) so as to maximize the ROI of the promotional plan as a whole.

According to the present invention, rather than focusing on an individual promotion event and determining which customers, based on historical data, meet a certain ROI criteria and excluding those who do not meet the criteria, the present invention focuses on a particular customer or customer group (called a class), and their ROI value with respect to an entire set of promotion events proposed to be implemental over a period of time. An analysis is also made of the impact of saturation and the "cannibalization" effect saturation may have on promotion events occurring before or after a particular promotion start date, or even occurring at the same time.

BRIEF DESCRIPTION OF THE DRAWINGS

FIG. 1 is a promotion flag table illustration a prior art approach to targeted marketing;

FIG. 3 is a promotion flag table illustrating the general approach of the present invention;

FIG. 4 is a flow chart illustrating the fundamental steps of the present invention;

FIG. 5 is a risk/return curve illustrating the budget allocation step of the present invention;

FIG. 7 is a cannibalization matrix illustrating the cannibalization effect for the time component;

FIG. 9 is a cannibalization matrix illustrating the cannibalization effect for the merchandise component;

FIG. 10 is a cannibalization matrix illustrating the cannibalization effect for the promotion-type component;

FIG. 11 is a cannibalization matrix illustrating the overall cannibalization effect for the components of FIGS. 7, 9, and 10.

DEFINITIONS

In this specification the following terms have the following meaning:

Promotion Event—a single promotion, for example, a specific mailing, catalog, or telemarketing campaign, focused on promoting particular products or services.

Promotional Plan—a specific set of at least two promotion events to be implemented at specific times over a period of time, e.g., monthly promotions to be mailed on the $5^{th}$ day of each month for a 12 month period or ten promotion events to be implemented on the same day. Generally a Promotional Plan will cover a relatively long period such as one year.

Planning Period—a specific time period over which the predictive models of the present invention are applied. A planning period may cover an entire promotional plan or only a fraction thereof (e.g. a planning period may cover 60 days of a promotional plan spanning one year).

Promotion Stream—a specific subset of a promotion plan generally associated with a customer or customer class.

Promotion Stream Expense—the total advertising cost associated with all promotion events in a promotion stream. Promotion stream expense is used to enforce the overall promotion budget and customer class budgets.

Promotion Stream Reward—the expected marketing income that results from implementing the promotion stream. Promotion stream reward is used to measure the financial benefit of a promotion stream. The promotion stream reward is determined by taking the gross promotion revenues of the promotion stream and subtracting the cost of the promotion events included in the promotion stream and the cannibalization factor (described below) of the promotion events included in the promotion stream.

Cannibalization—the expected impact (expressed in percentage) on the promotion stream reward of one promotion event due to the implementation of another promotion event.

Asset Class—a group of customers having identical or nearly identical financial characteristics that indicate identical or nearly identical ROI potential.

Micro Class—a class of customers within an asset class who have similar purchase patterns and/or demographics. Asset classes focus on financial characteristics; micro classes focus on behavioral characteristics.

DETAILED DESCRIPTION OF THE PREFERRED EMBODIMENT

Figure 2:
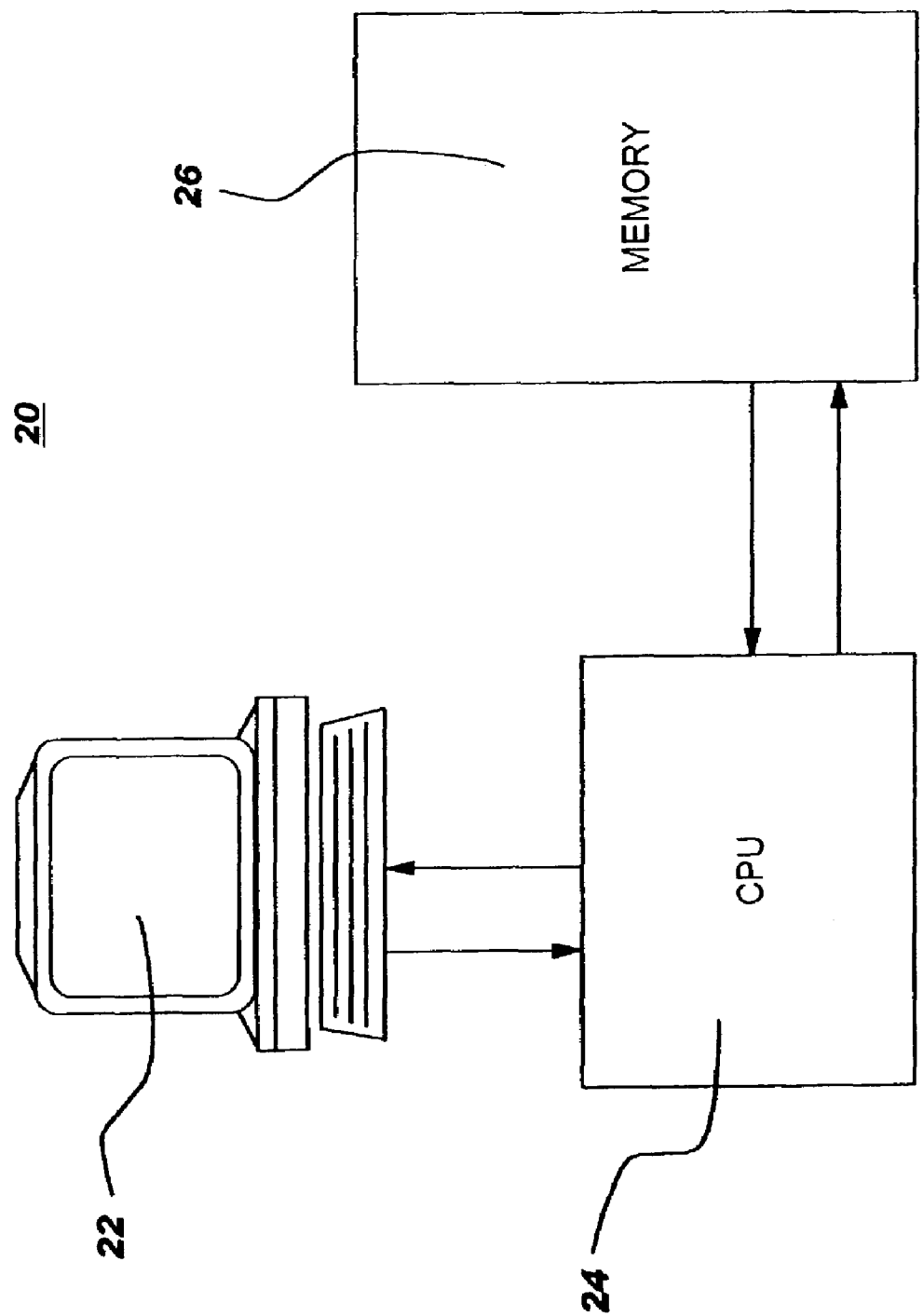
FIG. 2 is a block diagram of a computer environment in which the process of the present invention may be executed.

FIG. 2 illustrates a computer environment 20 in which the process of the present invention may be executed. The system 20 includes a central processor unit (CPU) 24, memory 26 and user interface 22. The CPU 24 may comprise one or more data processors configured in a PC, work station, main frame, network or other conventional apparatus. The user interface 22 may comprise traditional equipment such as a monitor and printer for displaying information for the user and keyboard and mouse for inputting information, as well as other peripherals such as scanner, voice recognition systems and touch screens. The system 20 can be configured to accommodate a traditional user interface and it is anticipated to be compatible with future interfaces as well. The system can further be configured as a network of computers in a known manner.

Memory 26 is operatively connected to CPU 24. Memory 26 contains a program or series of programs to instruct the system 20 to perform the process of the present invention as described below. Memory 26 may be any known memory medium such as RAM or PROM. The program may be integral to the system of the present invention or a discreet aspect of the present invention. The program may be adapted to function on known operating platforms and is anticipated to be compatible with emerging operating platforms as well. The program may be stored in any computer-readable medium such as a disk, tape, CD ROM, RAM or PROM.

FIG. 3 illustrates the general approach of the present invention, referred to herein as "horizontal marketing." In contrast to the vertical technique of the prior art illustrated in FIG. 1, the method of the present invention selects which promotions to send to a particular customer or customer segment by simultaneously considering all promotion events in a promotion plan or planning period as well as prior promotion events on an across-time (i.e. horizontal) basis as shown in FIG. 3. In FIG. 3, as in FIG. 1, individual customers or customer segments C0, C1, C2, C3 . . . Cn are listed along the vertical axis. However, along the horizontal axis, in addition to the currently proposed promotion p, prior promotions (p−1, p−2, p−3, . . . p−n) and the proposed promotion plan or planning period comprising promotions p+1, p+2, p+3, p+4, . . . p+n) are listed. As indicated by the arrow 30, the decision to include or exclude a particular customer or customer segment from a particular promotion event considers all promotion events in a promotion plan or planning period and past promotion events already sent to customers. In FIG. 3, a "1" still indicates a "go" for inclusion in the promotion and a "0" indicates a "no-go." But according to the present invention, the go/no-go decision is based on the additional information regarding cannibalization due to prior and future promotion events.

FIG. 4 illustrates the fundamental steps used by a typical firm ("Firm") using the present invention. Each of the steps provide input to the mathematical optimization and promotion-stream selection process described in more detail below.

At block A, information about all of the Firm's customers, current or prospective, is gathered. This information can be compiled from any standard source including, for example, an existing marketing database containing data regarding active customers of the Firm, newly gathered information regarding prospects separately gathered and stored in a "new prospects" database by the Firm, number of planning periods, number of micro classes to consider number of "starter sets" (described below) for use during optimization, marketing data purchased from a marketing research company, or any combination of these sources. Also gathered in block A is business information related to the Firm, including information on past and planned promotions, the overall promotional budget of the Firm, and information concerning the duration of and promotion events to be included in the promotional plan(s).

The customer data compiled in block A primarily comprises behavioral data (e.g., purchasing history, returned-items history, payment history), promotion history, and demographic data. It may also include data produced or derived in a known manner from the customer data. For example, "time as customer" can be derived by calculating the number of months since a first purchase was made by a particular customer.

At block B, the information compiled in block A is manipulated to group the customers into segments or clusters called asset classes. The objective of step B is to identify and group customers that have identical or nearly identical "investment profiles." Investment profiles are simply financial profiles of the customers which identify the financial value or potential financial value that the customers have to the Firm. For example, the Firm may choose to actively pursue customers that have a short history with the Firm and that have been unprofitable during their tenure as customers but whose demographics indicate that they will move into a more profitable asset class over time (e.g., a newly graduated professional who should realize a significant increase in spendable income within one year). Grouping customers into similar or identical asset classes typically assures that those in the same asset class will display an approximately identical ROI for any particular promotion, thereby simplifying the next step of assigning budget limits (minimum and maximum) to each asset class. Techniques and methods for manipulating data into groups are well known and will not be further discussed herein.

In step C, an analysis is made, considering the overall promotional budget of the Firm, to determine how best to spend the promotional budget so as to maximize the ROI. This step, called "Budget Allocation," looks beyond the single-promotion viewpoint taken by prior art methods. Instead, the budget is considered over a period of time and risk/return curves for each asset class (see FIG. 5) are established and analyzed in a known manner. The risk/return curves describe the diminishing returns of total promotion costs and are created for each asset class defined in step B as shown in FIG. 5. The horizontal axis represents "risk," defined as the total amount of advertising spent during a time period, e.g., 1 year. The vertical axis represents "return," defined as the total amount of net revenue (gross revenue minus returns minus bad debt minus canceled orders) received for the corresponding total advertising dollars spent. Techniques and methods for analyzing data in the manner described above are well known and will not be further discussed herein.

The overall promotion budget for a predetermined planning period is spread across all asset classes for the entire planning period using a non-linear program programming formulation of the budget allocation process ("NLP Budgeting"). Given the risk/return curves and how customers historically migrate between asset classes according to the level of advertising dollars invested, the Firm must specify, in the information gathering process (step A), the length of the planning period, the number of future planning periods to consider, and loose bounds representing the absolute minimum and maximum to spend on each asset class during each future planning period. With existing methods, the NLP Budgeting can be solved to produce a set of optimal budgets for each asset class for each future planning period.

NLP Budgeting generally is non-linear since maximizing the total return over multiple planning periods requires multiplication of two decision variables, namely, (1) how much to spend per customer in each asset class for a planning period, and (2) the size of each asset class during that planning period. Also, the overall horizontal marketing process only uses the current planning period budgets, but by looking forward in time, NLP Budgeting can make the optimal budget allocation decision for the current planning period. Further, should the Firm specify just one (1) planning period, the NLP Budgeting problem becomes linear (since the only decision variable is how much of the budget to allocate to each asset class).

The Firm can use NLP Budgeting with a variety of settings (different overall budgets, different number of planning periods, different customer migration rules, etc.) to perform "what if" scenarios to determine the best way to allocate the overall planning budget over the current planning period and not just for a single promotion event. This step allows the Firm to determine how best to spend their money to achieve their long-term goals.

The above-described steps A through C are all devoted to determining what is the best budget allocation for each asset class. Step D, called "promotional revenue scoring," shifts the focus to the individual customer level. Promotional revenue scoring builds upon conventional multiple regression or logistic regression models to determine the expected revenue for a particular promotion for each individual customer. This differs from the prior art methods which simply "rank" the customers to determine who to include in a particular promotion. With the firm's expertise in understanding the actual demand/revenue that the promotions produce, according to the present invention the typical ranking models are scaled to represent revenue in dollars so that individual customer promotional revenue scores can be compared to each other in a meaningful and understandable way. For example, if first promotion is ranked a "9" with respect to a particular customer and a second promotion is ranked a "8" with respect to the same customer, the only information of value that can be gleaned from this ranking is that the first promotion has a higher ranking than the second. According to the present invention, however, each promotion is assigned a revenue score with respect to each customer, so that for example, the first promotion might be given a revenue score of $100 and the second promotion may be given a revenue score of $5.00. As with the other computation steps used in the present invention, the technique and methods for performing the computational steps of the present invention are well known.

For each customer promotion score, the present invention looks backwards in time using promotional history data to determine which promotions a customer being scored has recently received. This data is available since it was gathered as part of the information gathering block, step A. Considering prior promotion received, and the cannibalization matrix (describe below), promotional revenue scores are adjusted (typically downward) by applying the cannibalization score. This enables the effect of past promotions to be considered, and the optimization step, described below, allows consideration of the effect of future promotions on a current promotion being considered. The promotional revenue scores are used by applying the optimization models (discussed below) over a period of time to cover an entire promotional planning period and identifying the best promotional selections from within the promotional plan for each customer, while also factoring in that all customers within a particular asset class are competing for limited budget dollars.

Figure 6:
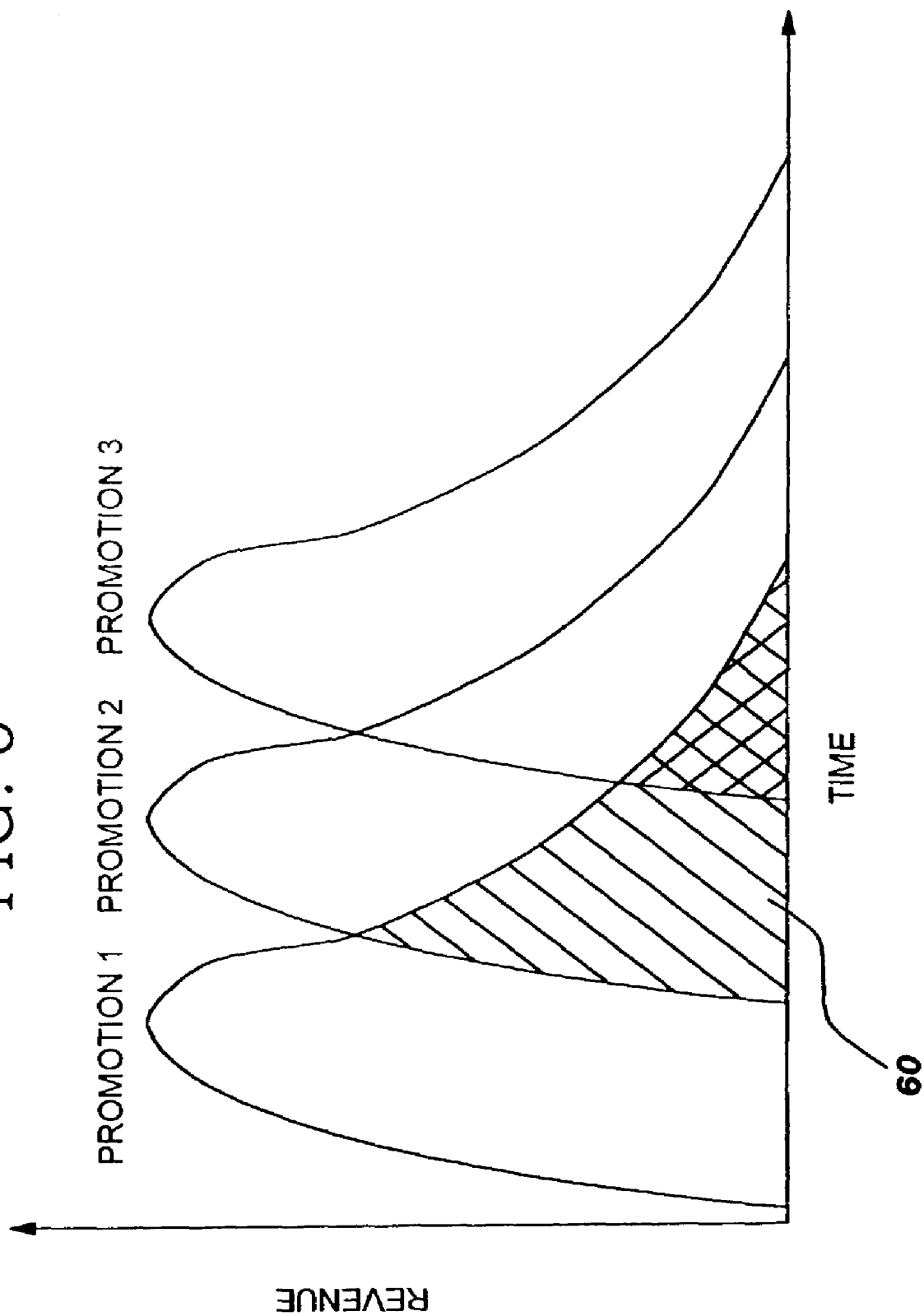
FIG. 6 is a graph illustrating the effect of cannibalization on multiple promotions.

At step E, an analysis of the interaction between promotions, called "Cannibalization Analysis," is performed. This involves determining the effectiveness of a particular promotion taking into consideration the timing and substance of the other promotions, both past and future (proposed). The use of the results obtained in Step E, in particular, results in superior results over prior art methods which focus on a single promotion at a time. Cannibalization refers to a portion of a first promotion's sales that are consumed or "cannibalized" by a subsequent promotion mailed while the first promotion is still generating sales. Conversely, a portion of the subsequent promotion's sales is consumed/cannibalized by the first promotion. Cannibalization can occur when two similar campaigns are sent to a customer within a short period of time. The two promotions interact to lessen the market impact of one or both promotions. FIG. 6 illustrates the effect of cannibalization on a first promotion (Promotion 1) due to the subsequent implementation of two additional promotions (Promotions 2 and 3). Promotions 2 and 3 saturate the customer with promotional activity because they overlap (in the shaded area 60) the effective life of Promotion 1.

It is generally preferable to minimize cannibalization within a promotion stream to maximize its ROI. Applicant has identified at least three components that significantly affect cannibalization: (1) a merchandising component (e.g., the type of goods); (2) a promotion-type component (e.g., promotions having incentives such as the inclusion of shipping costs as part of the promotions); and (3) a time-component (e.g., the time-period between promotions). The amount of cannibalization increases when similar promotions with similar merchandise are situated fairly close together in time. The more time between the promotions, the less the saturation effect. Dissimilar promotions with unlike merchandise will have a very small cannibalization effect regardless of the time period.

In accordance with the present invention, values indicating the interaction between the three components are compiled into a "cannibalization matrix" whose rows and columns represent promotions, and each entry is interpreted as the row promotion impact as a percentage drop in the column promotion "revenue" score. For each component, a cannibalization matrix is generated, and then the component-level matrices are combined to form the overall cannibalization matrix.

FIG. 7 illustrates a component-level cannibalization matrix which maps the cannibalization effect of one cannibalization components, promotions timing. Both horizontal and vertical axes have designations for past promotions (p−n, . . . , p−3, p−2, p−1), the current promotion p0, and future promotions which comprise the promotional plan (p+1, p+2, p+3, p+4, . . . , p+n). The numbers in the boxes defined by the matrix indicate the percentage cannibalization effect that one promotion will have on another if time is the only consideration. For example, it can be seen that 40% of current promotion p0 will be cannibalized by promotion p+1, and that 50% of promotion p+1 will be cannibalized by current promotion p.

Figure 8:
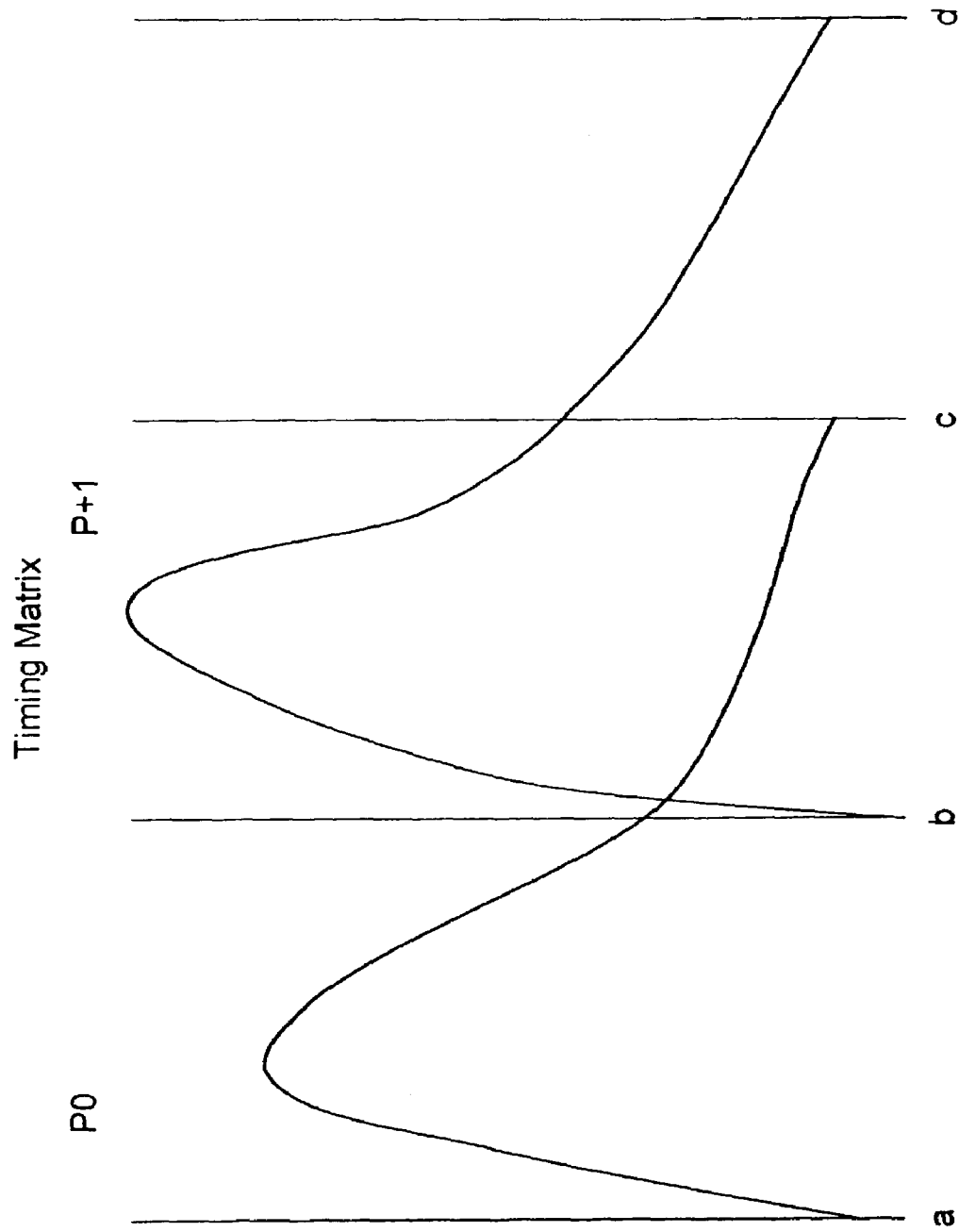
FIG. 8 is a graph illustrating how a cannibalization value is calculated.

FIG. 8 is a graph illustrating an example of how the cannibalization value can be calculated for promotions p0 and p+1. Assume that sales begin at time "a" and end at time "c" for promotion p0, and that sales begin at time "b" and end at time "d" for promotion p+1. The cannibalization based on overlapping time periods can be determined by dividing the sales attributed to the simultaneous period (the time between time "b" and time "c"—which is the same for both promotion p0 and promotion p+1) by the sales attributed to the entire time period for the promotion (the time between time "a" and time "c" for promotion p0, and the time between time "b" and "c" for promotion p+1), and then multiplying the result by 100%. Thus, if we assume that sales for the simultaneous period between time "b" and time "c" for promotion p0 is $800,000 and the total sales for promotion p0 (sales over the time period "a" to "c") is $2,000,000, the cannibalization time-component factor for p0 with respect to p+1 is ($800,000÷$2,000,000)(100%) =40%. This number is inserted into the cannibalization matrix for promotion timing (FIG. 7) at one location corresponding to p0(horizontal axis)p+1(vertical axis). For promotion p+1 with respect to promotion p0, if it is assumed that the total sales for promotion p+1 (sales over the time period "b" to "d") is $1,600,000, the cannibalization time-component factor for p+1 with respect to p0 is ($800,000÷$1,600,000)(100%)=50%. This process is carried out for all promotions in the matrix to fully populate the matrix.

Additional component-level cannibalization matrices are created for other components, such as the promotion type or the merchandise type. For example, FIG. 9 is a component-level cannibalization matrix for the merchandise-type component showing the similarities with respect to merchandise being offered for the same promotion events illustrated with respect to FIG. 7. Based on known techniques, an analysis is made of the merchandise being promoted during each promotion event to determine similarities and differences between the merchandise being offered and values are constructed which describe the similarities of the merchandise offered in the two promotion events. As an example, assume that the promotion plan involves the mailing of several different catalogs over a period of time, the catalog for promotion p is determined to contain offering of 30% apparel, 40% hardware, and 30% domestics, and the catalog for promotion p+1 is determined to contain offerings of 20% apparel, 80% hardware, and 0% domestics. Common distance formulas (e.g., the Pythagorean Theorem) and common scaling techniques can be used to determine the similarity between the two catalogs. One simple technique is sum the overlap of the catalogs by comparing each of the values for the characteristics (e.g., 30 vs. 20 for apparel; 40 vs. 80 for hardware; and 30 vs. 0 for domestics), take the lowest value of each comparison (e.g., 20 for apparel, 40 for hardware, and 0 for domestics) and add these number together (20+40+0=60% similarity). Similarity values for each combination are determined and input to the merchandise-type cannibalization matrix shown in FIG. 9.

FIG. 10 is a component-level cannibalization matrix for the promotion-type component. There are a wide variety of factors which can be compared to determine the similarities between types of promotions. For example, catalog having 200 pages would be expected to have a different impact than a 160 page catalog. If it is assumed that promotion p0 is a 200 page catalog and promotion p+1 is a 160 page catalog, using the formula (1−(D/M)(100), where D is the difference in then number of pages between the two catalogs (200−160=40) and M is the maximum page count of the larger of the two catalogs (200), a cannibalization factor of 80% is determined. Using similar calculations comparing the page count of all of the promotions p−3 through p+4, the matrix of FIG. 10 can be fully populated.

As many component-level matrices as desired can be prepared to compare any parameters and derived variables representing the comparison, and then the results of all of the component-level matrices are combined and compared in a known manner (e.g., using empirical experience or predictive modeling such as regression) to come up with an overall cannibalization matrix for a promotion plan. For example, the derived values from the matrices of FIGS. 7, 9, and 10 can be combined into an overall cannibalization matrix, illustrated in FIG. 11, using the following formula: $(M_{wc}*M)+(P_{wc}*P)*T_{sc}*P$, where $M_{wc}$ is a merchandise-type weighting coefficient, M is the merchandise-type cannibalization value, $P_{wc}$ is a promotion-type weighting coefficient, P is the promotion-type cannibalization value, $T_{sc}$ is a scaling coefficient, and T is the promotion-timing cannibalization value. The weighting coefficients $M_{wc}$ and $P_{wc}$ are coefficients derived form the knowledge-base of the Firm and gathered during in block A of FIG. 2 during information gathering (step A). Use of the scaling coefficient $T_{sc}$ to assure that the results are not too large or two small is well-known.

Assuming $M_{wc}$ to be 0.75, $P_{wc}$ to be 0.25, $T_{sc}$ to be 0.05, and plugging in the derived cannibalization values for promotion P0 and P+1, for (P, P+1) the cannibalization value is 1.15% and the cannibalization value for (P+1, P0) is 1.62%. Each of the matrix positions for FIGS. 7, 9, and 10 are plugged into the equation in the same manner to derive the overall cannibalization matrix shown in FIG. 11.

To validate the combination (or facilitate a predictive model) of the component-level matrices, an "observed" cannibalization matrix can also be constructed in the following manner. Each p0 and p+1 entry of the "observed" cannibalization matrix represents the observed maximum possible fraction of sales lost from promotion p0 because promotion p+1 was mailed also based upon the customers in the database who received both promotions p and p+1 and purchased product from p+1 which was available in p0. We will also provide an algebraic formula representing this definition. Consider the promotion pair (I, J), where I is promotion p0 and J is promotion p+1. Let S be the set of people who received both promotion I and promotion J. Let I(S) be the total sales from promotion I generated by customers in the set S. Similarly, let J(S) be the total sales from promotion J generated by customers in the set S. Let A(J) be the sum of sales of customers in set S of product from promotion J for which the product was also available from promotion I. Using these parameters, the "observed" cannibalization entry becomes A(J)/[I(S)+A(J)], because I(S)+A(J) represents the maximum sales that I would have had to customers in the set S had promotion J not been mailed. The following equation validates this: {I(S)+A(J)}−{A(J)/[I(S)+A(J)]}*{I(S)+A(J)}=I(S). Note that this "observed" matrix now captures all the relative pairwise cannibalization effects amongst all promotions in the promotion plan. Furthermore, this "observed" matrix represents the maximum impact and, hence, needs to be scaled back to represent the reality that not all the sales from J can be attributed back to I. This can be accomplished conducting a multiple mail test to measure the actual cannibalization effect of J on I by mailing a control group just I and a test group both I and J. With the results of this test, the entire "observed" cannibalization matrix can be scaled back to have more realistic values. The resulting scaled-back observed cannibalization matrix can be used to validate on empirically combined cannibalization matrix or to facilitate a predictive modeling technique as the dependent variable.

Cannibalization can either have a positive or negative effect. The negative effect of cannibalization is minimized by evaluating a total promotional strategy over an extended period of time, giving the firm an understanding of the incremental gains or losses due to multi-promotions, and then making marketing decisions accordingly. By quantifying cannibalization in the cannibalization matrix, an overall marketing strategy, i.e., one that considers, for example, an entire year of promotion events and the impact of the promotion events on each other, can be utilized to maximize the effect of all of the promotions.

Step F, called Micro Class Grouping, is a further classification of the asset classes. A micro class is a subset of an asset class. The customers of a particular asset class are grouped, using known computational techniques, based on similar behavioral characteristics or preferences. The objective of the Micro Class Grouping step is to group customers within an asset class by common characteristics so that a business decision based on these characteristics can be made and it can be predicted, with some degree of accuracy, that each member of the group will react in a like manner to the promotional stream. By further classifying customers in this manner, the accuracy of predictions regarding the ROI for a promotion can be further increased. For example, a particular class of customers may be more prone to purchase based on offers advertised on the internet. Thus, one micro class might be customers within an asset class who have purchased based on internet advertising. Another micro class might be customers within an asset class who have purchased consumer electronics items. During the Micro Class Grouping step, each customer is analyzed and segmented according to target criteria defineable by the firm in a known manner.

Once the steps A–F have been completed, at step G a mathematical optimization is performed on the results of each step and applied to each customer, thereby mapping out an optimal promotion for each customer or customer class which is then mapped to each customer according to their class membership. The order of processing of steps A–F is not critical; the steps can be implemented in the most time-efficient manner if desired, using, for example, the well known concept of parallel processing.

Figure 12:
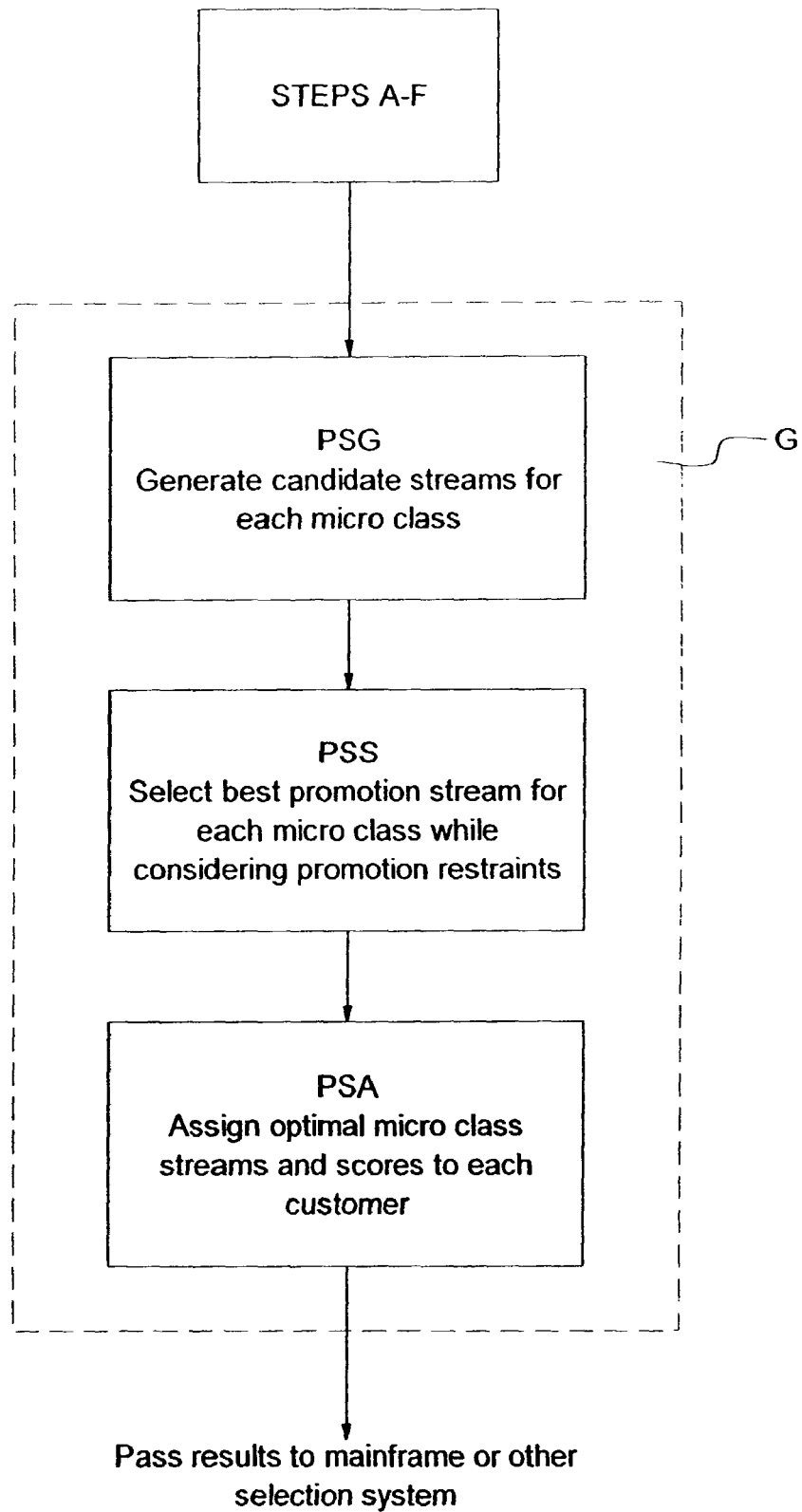
FIG. 12 is a flow chart illustrating the optimization process of the present invention.

By considering all of a customer's reward scores and the cannibalization matrix, the execution of the optimization step G allows the selection of a future combination of mailings that best fits that customer's characteristics and budget constraints. The order of selection for these mailings is not dependant on what is available to send on the next promotion date (the current state of the art) but rather on what is available to implement over the next three weeks or six months or whatever planning period the Firm chooses. Optimization step G, described in more detail below with respect to FIG. 12, is simply an application of well known integer and linear programming techniques, such as branch and bound, linear relaxation, column generation, and variable upper bounding with penalties, to select the promotion streams for each customer against a given promotion plan and a given planning period. By examining and using data related to a plurality of promotions over time (i.e., the promotional plan) use of these well known optimization techniques results in an optimal promotion stream for each customer. One such technique, described in a summary manner below, is illustrated in "Operational Research In Industry," edited by T. Ciriani, S. Gliozzi, E. Johnson, and R. Tadei, pp 259–263, Copyright June 1999 (MacMillan Business, Houndmills, Basingstoke, Hampshire RG21 6XS).

In the first step of the optimization process called Promotion Stream Generation (PSG), a "starter set" of candidate promotion streams is determined for each micro class. The starter sets are small subsets of the total number of potential promotion combinations. PSG is an integer programming model where the decision variables represent the mail or no mail decision of a promotion stream. Its objective is to maximize the total promotion revenue of the stream minus the total promotion cost of the stream minus the cannibalization of the promotions amongst themselves in the promotions stream subject to the promotion cost falling between a lower budget bound and upper budget bound associated with the asset class that the micro class belongs to. To build the elements of the starter set, the difference between the lower and upper budget bounds is divided into a user-specified number of slices. This user-specified numbers is one of the parameters the Firm must set in block A and its value depends on the computational time available to solve the total optimization step G. Each slice then has its own lower and upper budgeting bounds for which an optimal promotion stream can be found. These resulting solutions from each slice form the starter set. Note that PSG can be solved independently for each micro class. This allows for parallelization of the PSG portion of the optimization step according to micro class.

The next step, Promotion Stream Selection (PSS), is to consider the entire set of starter sets for each micro class and to select the best promotion stream for each micro class from its set of starter sets while maximizing the total marketing income (Revenue-promotion cost-cannibalization). If the only concern in the optimization step were to maximize marketing income with respect to micro classes, then PSS would not have to be solved the best promotion stream of each starter set could be used as the promotion stream for the customers in the corresponding micro class. However, there are very important constraints that "tie" all the micro classes together. They include: total promotion budget, which adds up the promotion costs of all promotions sent; individual promotion budgets, which reflect the forecasted lower and upper bounds on the number of each promotion to be mailed; asset class budget bounds, which were set in the budget allocation step; and the mailing to each micro segment exactly one promotion stream, which ensures that PSS provides a meaningful answer. Furthermore, it is necessary that PSG and PSS together provide a feasible answer. An infeasible solution results in information which is useless for the Firm. Since PSG represents the column generation portion of the delayed column generation approach, PSS represents the corresponding master problem, and no facility is incorporated for adding a new candidate stream, variable upper bounding is added with penalty costs in the objective to ensure that a feasible, i.e. meaningful and useful, solution for PSS is achieved. This allows for the final solution to possibly violate all the constraints mentioned above except for the last constraint, i.e., that each micro segment receives exactly one promotion stream. This is an acceptable solution for the Firm. Furthermore, since with the variable upper bounding solution, the constraint violations can be calculated and provide feedback on where the Firm's constraints were unreasonable, i.e., infeasible.

PSS is a linear programming problem where the decision variables represent values between (and including) 0 and 1. Typically, the resulting answer to PSS states that a micro segment will receive one (1) of the promotion streams in its corresponding starter set and none (0) of the others; this, makes it easy to assign the resulting promotion stream to each of the customers in the micro class. However, it is also possible for two or more of the promotional streams to be assigned "fractionally" to the micro segment such that their fractional assignments add up to one (1). For example, it is possible for promotion stream A to have been assigned to 0.4 of the microsegment and promotion stream B to have been assigned to 0.6 of the same microsegment. This can be interpreted as 40% of the members of this micro segment must receive stream A and 60% must receive stream B.

To account for this possibility, a heuristic, Promotion Stream Assignment (PSA), can be applied to the optimal promotion streams from PSS such that each customer of each micro segment receives one optimal promotion stream. This is easy if there is one (1) optimal promotion stream assigned to the micro class. However, if there are two or more "fractional" optimal promotion streams, as described above, then for each customer in the corresponding micro segment the total marketing income (revenue-cost-cannibalization) is calculated for each "fractional" stream. The resulting list of marketing income scores are sorted in descending order. Each customer is assigned their highest scoring "fractional" stream unless that particular fractional stream has already been assigned the appropriate number of times at which point this customer gets assigned the next available fractional stream with the next highest score. This heuristic guarantees that each customer in a micro class with optimal fractional promotion streams gets assigned one and only one stream in the optimization step.

To maximize the optimizing effect of the present invention, block A is constantly updated with data and the entire process is rerun on a regular basis so that the most current information can be used for the modeling.

While there has been described herein the principles of the invention, it is to be understood by those skilled in the art that this description is made only by way of example and not as a limitation to the scope of the invention. Accordingly, it is intended by the appended claims, to cover all modifications of the invention which fall within the true spirit and scope of the invention.

We claim:

1. In a computer environment, a method for targeted marketing of goods or services of an entity to specific customers via a promotion stream, having a plurality of promotions, comprising the steps of:
   accessing customer data pertaining to a plurality of customers;
   identifying a promotional plan, comprising a plurality of promotional events, spanning a predetermined time period;
   analyzing, using a processor in said computer environment, each promotional event or promotion in the promotional plan and the customer data to determine a risk/return score for said promotional plan with respect to each of said customers;
   analyzing, using said processor, the effect of cannibalization on the promotional plan; and
   optimizing said promotion stream based on the analyses of the promotional plan and the cannibalization effect.

2. The method as set forth in claim 1, wherein said promotional plan comprises a plurality of promotions to be implemented over said predetermined time period.

3. The method as set forth in claim 2, wherein said step of analyzing the effect of cannibalization on the promotional plan comprises comparing each promotion of the promotional plan and developing a cannibalization matrix which assigns a cannibalization value to the effect of each of said promotions on all of the other promotions comprising the promotional plan.

4. The method as set forth in claim 3, wherein said cannibalization matrix comprises a plurality of level matrices dimensional.

5. The method as set forth in claim 4, wherein said cannibalization matrix includes a component-level matrix which defines the effect of the timing of each of said promotions in the promotional plan on the other promotions in said promotional plan.

6. The method as set forth in claim 4, wherein said cannibalization matrix includes a component-level matrix which defines the effect of type of the goods or services being promoted by each of said promotions in the promotional plan on the other promotions in said promotional plan.

7. The method as set forth in claim 4, wherein said cannibalization matrix includes a component-level matrix which defines the effect of the type of promotion being used for each of said promotions in the promotional plan on the other promotions in said promotional plan.

8. The method as set forth in claim 3, wherein said optimizing step includes the step of applying said cannibalization values to determine said promotion stream.

9. The method as set forth in claim 8 wherein said customer data comprises budgetary information pertaining to the entity, said method further comprising the steps of:
classifying said customers into asset classes based on common financial characteristics; and
assigning promotional budgets for each of said asset classes based on said budgetary information.

10. The method as set forth in claim 9 wherein said customer data further includes information regarding the purchase patterns and demographics of said plurality of customers, further comprising the step of classifying said asset classes into micro classes based on said purchase patterns and/or demographics so that customers having approximately identical purchase patterns and/or demographics are classified together in the same micro class.

11. The method as set forth in claim 3, further comprising the steps of:
predicting the expected revenue for each of said customers with respect to each of said promotions and generating a predicted revenue value for each customer/promotion combination;
calculating a promotional revenue score for each of said predicted revenue values; and
scaling said promotional revenue scores into monetary values.

12. In a computer environment, a system for targeted marketing of goods or services of an entity to specific customers via a promotion stream, having a plurality of promotions, comprising:
means for accessing customer data pertaining to a plurality of customers;
means for identifying a promotional plan, comprising a plurality of promotional events, spanning a predetermined time period;
processing means for analyzing each promotional event or promotion in the promotional plan and the customer data to determine a risk/return score for said promotional plan with respect to each of said customers and for analyzing the effect of cannibalization on the promotional plan; and
means for optimizing said promotion stream based on the analyses of the promotional plan and the cannibalization effect.

13. The system as set forth in claim 12, wherein said promotional plan comprises a plurality of promotions to be implemented over said predetermined time period.

14. The system as set forth in claim 13, wherein said means for analyzing the effect of cannibalization on the promotional plan comprises means for comparing each promotion of the promotional plan and developing a cannibalization matrix which assigns a cannibalization value to the effect of each of said promotions on all of the other promotions comprising the promotional plan.

15. The system as set forth in claim 14, wherein said cannibalization matrix comprises a plurality of component level matrices.

16. In a computer environment, a computer program product for targeted marketing of goods or services of an entity to specific customers via a promotion stream, the computer program product having a plurality of promotions, comprising a computer-readable storage medium having computer-readable program code embodied in the medium, the computer-readable program code comprising:
computer-readable program code that accesses customer data pertaining to a plurality of customers;
computer-readable program code that identifies a promotional plan, comprising a plurality of promotional events, spanning a predetermined time period;
computer-readable program code that analyzes, using a processor in said computer environment, each promotional event or promotion in the promotional plan and the customer data to determine a risk/return score for said promotional plan with respect to each of said customers;
computer-readable program code that analyzes, using said processor, the effect of cannibalization on the promotional plan; and
computer-readable program code that optimizes said promotion stream based on the analyses of the promotional plan and the cannibalization effect.

17. The computer program product as set forth in claim 16, wherein said promotional plan comprises a plurality of promotions to be implemented over said predetermined time period.

18. The computer program product as set forth in claim 17, wherein the computer-readable program code that analyzes the effect of cannibalization on the promotional plan comprises computer-readable program code that compares each promotion of the promotional plan and develops a cannibalization matrix which assigns a cannibalization value to the effect of each of said promotions on all of the other promotions comprising the promotional plan.

19. The computer program product as set forth in claim 18, wherein said cannibalization matrix comprises a plurality of component level matrices.

20. The method of claim 1 comprising the further step of providing a report to an owner of the entity, the report including a list of results of the analysis of the effect of cannibalization on the promotional plan.

* * * * *